Dec. 22, 1970   E. P. HOPKINS   3,548,592
COMBINATION FUEL NOZZLE AND SPARK PLUG FOR A GAS TURBINE
Filed June 13. 1969   2 Sheets-Sheet 1
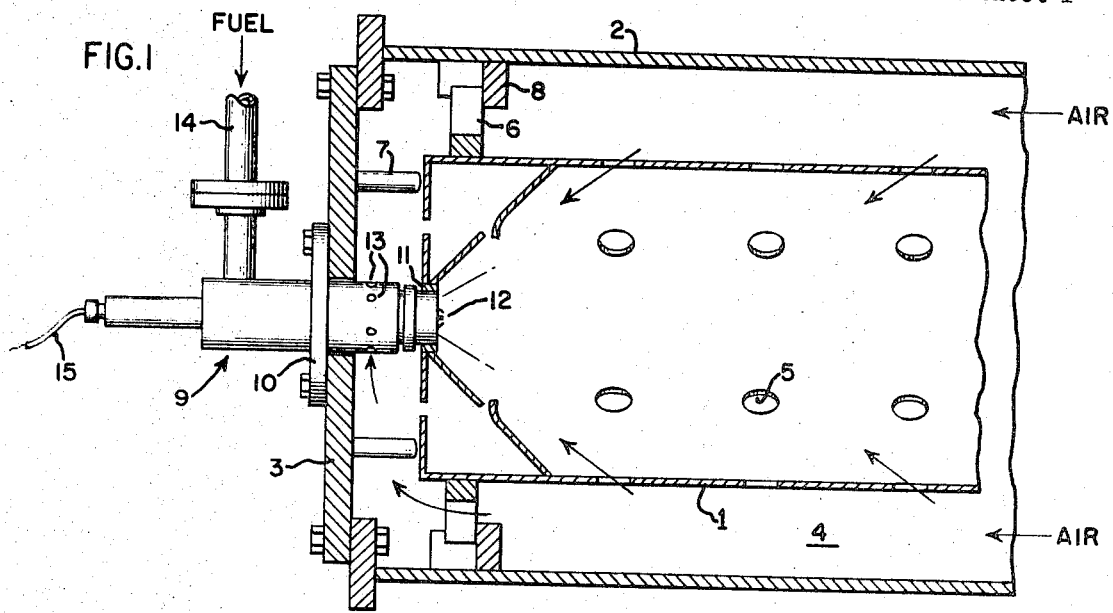
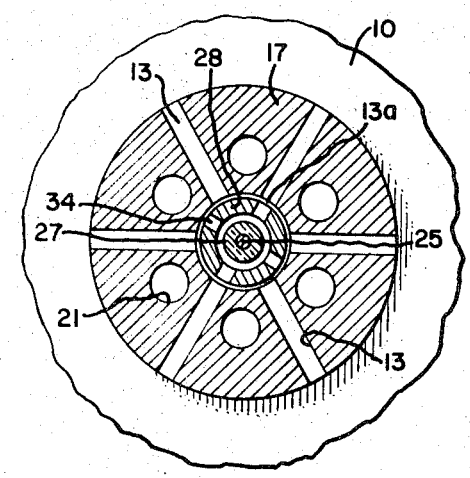
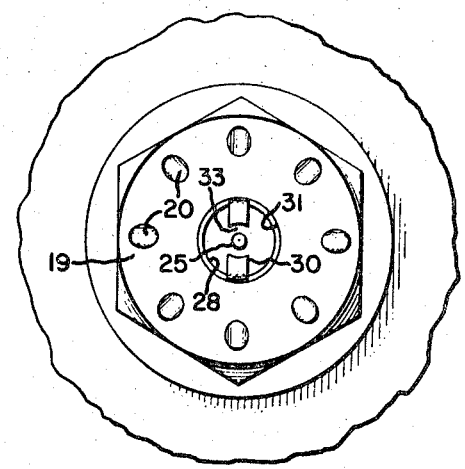
INVENTOR:
EDWARD P. HOPKINS,
BY W. C. Crutchy
HIS ATTORNEY.

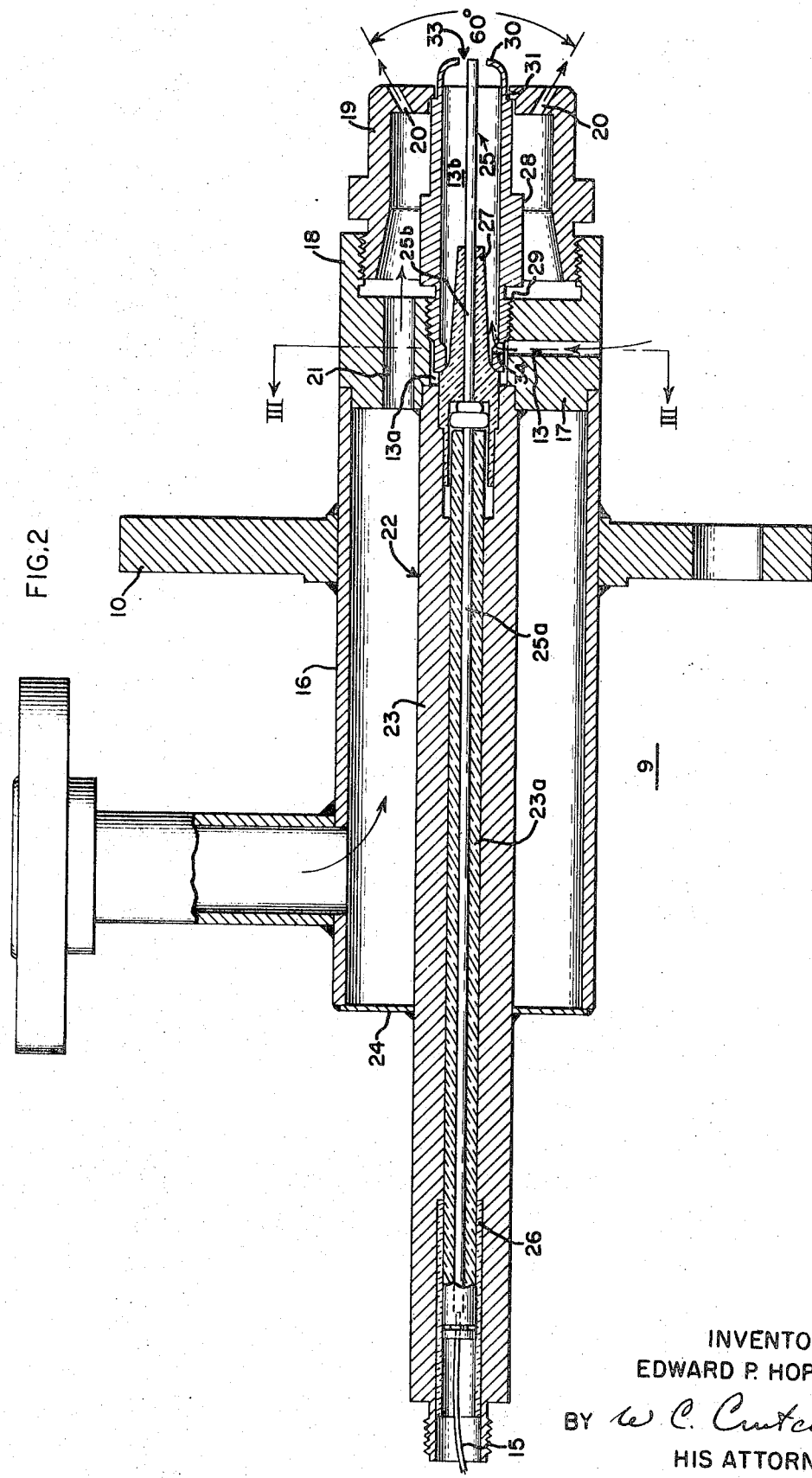

United States Patent Office 3,548,592
Patented Dec. 22, 1970

3,548,592
COMBINATION FUEL NOZZLE AND SPARK
PLUG FOR A GAS TURBINE
Edward P. Hopkins, Schenectady, N.Y., assignor to General Electric Company, a corporation of New York
Filed June 13, 1969, Ser. No. 833,134
Int. Cl. F02c 7/26
U.S. Cl. 60—39.82         4 Claims

ABSTRACT OF THE DISCLOSURE

A spark plug is disposed coaxially within a fuel nozzle for the combustion chamber of a gas turbine. Gaseous fuel flows from outside through a chamber surrounding the spark plug and through fuel feed passages where it is ignited by electrodes in the nozzle face. Air for cooling and purging the electrode space is supplied through radial passages interspersed among the fuel supply passages.

BACKGROUND OF THE INVENTION

This invention relates to an improved device for supplying fuel to the combustion chamber of a gas turbine and igniting the fuel.

One conventional arrangement for a gas turbine combustion chamber includes a perforated or louvered liner coaxially disposed with a casing and having a fuel nozzle supplying fuel to the liner along its axis. As a means of lighting the fuel and air mixture, it is also conventional to extend a spark plug transversely through the casing and liner walls of one or more combustion chambers. Due to the fact that the space between the liner and the wrapper is filled with pressurized air and also due to the fact that the combustion chamber temperature varies considerably, problems of sealing against leakage and fretting due to thermal movements are encountered with respect to the spark plugs.

Another problem with spark plugs for gas turbines is that the electrodes are exposed to very high temperatures. Partial solutions to these problems have been exemplified by innovations such as retractable spark plugs as shown in U.S. Pat 2,604,510 to D. C. Berkey or air cooled spark igniters such as shown in U.S. Pat. 2,701,324 to D. C. Peroutky et al.

It would be useful to dispose the spark plug electrodes symmetrically with respect to the fuel supply and in a fuel rich zone for ease of ignition such as suggested, for example, in U.S. Pat. 2,770,097 to W. C. Walker, but that proposed construction is not applicable to the conventional double wall gas turbine combustion chamber of the type described previously.

Accordingly, one object of the present invention is to provide an improved means for supplying fuel and igniting the fuel in a gas turbine combustion chamber.

A more particular object is to provide a combination spark plug and fuel nozzle for use in a gas turbine combustion chamber of the type having a liner within an outer wrapper, and wherein the spark electrodes are cooled and purged by air.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawings in which:

FIG. 1 is an elevation drawing, in section, of a gas turbine combustion chamber, FIG. 2 is an enlarged elevation drawing, in section, of the combination spark plug and fuel nozzle in its preferred form, FIG. 3 is a cross section view taken along lines III—III, and FIG. 4 is an end view of the nozzle face taken from inside the combustion lines.

SUMMARY OF THE INVENTION

Briefly stated, the invention is practiced by providing a spark electrode arrangement coaxially within a fuel nozzle. Fuel flows through longitudinal gas supply passages to a chamber surrounding the electrodes and from there to the interior of the liner. Air is supplied from the space between the combustion liner and the casing through radial passages interspersed with the aforesaid longitudinal passages to the electrode interior to purge and cool the same.

DESCRIPTION OF THE PREFERRED EMBODIMENT

Referring to FIG. 1 of the drawing, a partial sectional view of a gas turbine combustion chamber shows a cylindrical combustion liner 1 disposed within a wrapper 2 which is closed off by an end plate 3 to provide an outer casing. The casing is arranged to receive pressurized air from the gas turbine compressor at its other end (not shown). The air is supplied through the space 4 between the liner and the casing and enters the liner through holes, perforations or louvers such as 5 to mix therein with the fuel. The combustion chamber liner and casing shown is merely exemplary of many similar arrangements and the combustion liner ports or louvers can take many forms, which are not material to the present invention. Here, the liner 1 is centered by means of a fuel nozzle and spark plug assembly 9, and prevented from moving axially by means of pins 7 and stops 6, 8.

The combination fuel nozzle and spark plug which is the primary feature of the present invention is indicated generally at 9. It is attached to the combustion wrapper end plate 3 by means of a flange 10 and extends with sliding clearance through a collar 11 disposed on the liner axis so as to inject fuel into the liner primary combustion zone. As will be amplified later in the specification, the spark plug electrodes are also disposed on the liner axis at 12 and are cooled and purged by air entering through ports 13 between the liner 1 and the end plate 3. The combination fuel nozzle and spark plug 9 is serviced outside of the casing by means of a gaesous fuel supply pipe 14 and spark plug lead 15.

Referring now to FIG. 2 of the drawing which is an enlarged detailed view of the combination fuel nozzle and spark plug 9, the device is seen to comprise a hollow cylindrical fuel nozzle housing 16, closed off at one end by a member providing an end wall 17 and a projecting, internally threaded lip 18. A fuel nozzle gas cap 19 is arranged with threads at one end to screw into the lip 18, and at the other end thereof has a series of circumferentially spaced fuel supply passages 20 which are preferably directed outward along the elements of a cone subtending an included angle of about 60 deg. A number of circumferentially spaced longitudinal passages 21 extend through the end wall 17 in order to carry fuel from the fuel nozzle housing 16 into the interior of the fuel nozzle gas cap 19.

Extending along the axis of the fuel nozzle housing and the fuel nozzle gas cap is a spark plug assembly shown generally as 22. This includes a steel support sleeve 23 which is permanently attached by means of welding to the fuel nozzle housing at 24 and welded to the end wall 17. Extending through the center of the support sleeve 23 is a Pyrex sleeve 23a, within which is a central electrode 25. The Pyrex sleeve is supported at one end by means of a glass bushing 26 wrapped with mica and at the other end by means of a porcelain insulator 27. The central electrode 25 is made up of two abutting parts as shown, one 25a within sleeve 23a and the other 25b within insulator 27.

A grounded electrode, indicated within the fuel nozzle cap by reference numeral 28, comprises a cylindrical sleeve threaded into a bore in the end wall 17 as indicated at 29. The terminating tip 30 of electrode 28 extends through a central hole 31 in the fuel nozzle cap and is sealingly engaged therewith by means of a shoulder as indicated. A spark gap 33 is thereby formed by electrodes 25, 28 directly at the face of the nozzle.

In order to supply air to the interior of the electrode space for cooling and purging, a number of radial passages 13 (see also FIG. 1) are spaced around the end wall 17 and interspersed among the longitudinal fuel supply passages 21 so as not to intersect therewith. These connect with an air supply space 13a between sleeve 28 and the bore in wall 17. Additional air supply holes 34 in the outer electrode sleeve 28 provide access of the air from space 13a to an inner electrode cooling and purging chamber 13b. This air exits through the spark gap passage at 33 to cool the electrodes and purge chamber 13b of combustion products.

Further clarification may be had by reference to FIG. 3 which is a cross section taken through the end wall 17. This view shows how the radial air supply passages 13 are interspersed among the longitudinal fuel supply passages 21 in wall 17. Also shown are the inner air supply passages 34 in the electrode sleeve 28.

FIG. 4 of the drawing is an end view of the nozzle cap 19 showing how the fuel supply passages 20 are circumferentially spaced around the central spark gap electrode 25, 28 arrangement.

OPERATION

The operation of the invention is as follows:

Fuel entering the nozzle housing 16 flows longitudinally through the passages 21 to the interior of the fuel cap 19 and is injected through the fuel supply passages 20 to the interior of the combustion liner 1. There it is mixed with air to provide a combustion mixture. Combustion is initiated by activation of the spark across electrodes 25, 28. Ignition is facilitated by virtue of the location of the spark gap 33 in the fuel rich region at the face of the nozzle.

Cooling air for the electrodes flows from the air supply space 4 between the liner and the casing through passages 13, 13a and 34 into the space between the electrodes and out the spark gap 33. This air also serves to keep the space between the electrodes purged of any fuel or combustion products.

Some advantages of the aforedescribed arrangement are as follows. Because of the placement and cooling of the spark plug, it is not necessary to cause it to retract or provide further shielding. By being symmetrically disposed on the center line in a fuel rich region, it ignites easily and does not interfere with the flow pattern. Since the spark plug is contained within the fuel nozzle, it prevents sealing and fretting problems which have previously been encountered with separate spark plugs at other locations.

While there has been described herein what is considered to be the preferred embodiment of the invention, other modifications will occur to those skilled in the art, and it is intended to cover in the appended claims all such modifications as fall within the true spirit and scope of the invention.

What is claimed as new and desired to secure by Letters Patent of the United States is:

1. A combustion fuel nozzle and spark plug for a gas turbine combustion chamber of the type having a liner disposed within a casing and defining an air space therewith comprising:

a fuel nozzle housing attached to said casing and supplied with fluid fuel, a fuel nozzle cap connected to said housing, said housing and nozzle cap extending across said air space into said liner, the nozzle cap having a face defining circumferentially spaced fuel outlet passages inside the liner, a spark plug assembly disposed within the fuel nozzle housing and extending from outside the casing into the liner, said assembly including electrodes defining a spark gap at the face of the nozzle among said fuel outlet passages, and air passage means arranged to conduct air from the air space into said spark plug assembly and out said spark gap to cool the electrodes and purge the electrode space of fuel and combustion products.

2. The combination according to claim 1, wherein said fuel nozzle housing and said fuel nozzle cap are separated by an end wall having a plurality of longitudinal passages defined therein, and wherein said air passage means comprise a plurality of radial passages defined in said end wall and interspersed among said longitudinal fuel passages.

3. The combination according to claim 1, wherein said spark plug assembly comprises a grounded electrode sleeve sealingly engaged between said housing and said nozzle cap so as to define a fuel chamber on the outside of the grounded electrode and an air cooling and purging chamber within, and wherein said air passage means comprises a plurality of radial passages extending into said air cooling and purging chamber.

4. A combination fuel nozzle and spark plug for a gas turbine combustion chamber of the type having a liner disposed within a casting and defining an air space therewith, comprising:

a fuel nozzle housing including a hollow cylindrical member attached to said casing and extending therethrough to terminate in an end wall, said end wall defining a central bore, and further defining a plurality of circumferentially spaced longitudinal passages around the bore, and further defining a plurality of circumferentially spaced radial passages interspersed among said longitudinal passages and extending into the bore.

a fuel nozzle gas cap attached to said fuel nozzle housing and defining therewith a fuel supply chamber interconnected with said longitudinal passages, said fuel nozzle gas cap further extending into said liner and having a face defining fuel outlet passages circumferentially spaced in said face for injecting fuel into the liner, a spark plug assembly coaxially disposed with respect to said housing and said nozzle cap, including an insulated central electrode extending along the axis through the housing and cap, and an outer grounded electrode sleeve surrounding and spaced from the central electrode, said electrode sleeve sealingly engaged between the end wall and the nozzle cap face to enclose a cooling and purging chamber, and additional passage means through said electrode sleeve and communicating with said radial passages to supply air from said air space to said cooling and purging chamber.

References Cited

UNITED STATES PATENTS

| | | | |
|---|---|---|---|
| 2,398,611 | 4/1946 | Beggs | 60—39.82 |
| 2,541,900 | 2/1951 | Williams | 60—39.82 |
| 2,604,510 | 7/1952 | Berkey | 60—39.82 |
| 2,635,423 | 4/1953 | Oakes | 60—39.82 |
| 2,701,324 | 2/1955 | Peroutky | 60—39.67 |
| 2,770,097 | 11/1956 | Walker | 60—39.66 |
| 2,865,441 | 12/1958 | Coupe | 60—39.82 |
| 3,073,121 | 1/1963 | Baker | 60—39.82 |

DOUGLAS HART, Primary Examiner